US010787941B2

(12) United States Patent
Ito et al.

(10) Patent No.: US 10,787,941 B2
(45) Date of Patent: Sep. 29, 2020

(54) DRAIN NUT ATTACHMENT STRUCTURE FOR SYNTHETIC RESIN COVER

(71) Applicant: MAHLE FILTER SYSTEMS JAPAN CORPORATION, Tokyo (JP)

(72) Inventors: Daizo Ito, Saitama (JP); Shin Yoshida, Fujimino (JP); Atsushi Nonaka, Kawagoe (JP); Yuichi Kato, Kawagoe (JP)

(73) Assignee: MAHLE FILTER SYSTEMS JAPAN CORPORATION, Tokyo (JP)

( * ) Notice: Subject to any disclaimer, the term of this patent is extended or adjusted under 35 U.S.C. 154(b) by 354 days.

(21) Appl. No.: 15/813,446

(22) Filed: Nov. 15, 2017

(65) Prior Publication Data
US 2018/0156084 A1  Jun. 7, 2018

(30) Foreign Application Priority Data

Dec. 1, 2016  (JP) ................................. 2016-233725
Jul. 11, 2017  (JP) ................................. 2017-135114

(51) Int. Cl.
*F01M 11/04* (2006.01)
*F16B 33/00* (2006.01)
(Continued)

(52) U.S. Cl.
CPC ..... *F01M 11/0408* (2013.01); *F01M 11/0458* (2013.01); *F16B 33/006* (2013.01);
(Continued)

(58) Field of Classification Search
CPC .......... F01M 11/0408; F01M 11/0458; F01M 2011/0416; F16N 31/00; F16B 33/06; B62D 29/041
See application file for complete search history.

(56) References Cited

U.S. PATENT DOCUMENTS 4,938,314 A   7/1990  Sitzler et al.
8,109,704 B2* 2/2012 Lewis ................ F01M 11/0408
                                                411/111
(Continued)

FOREIGN PATENT DOCUMENTS

DE   38 38 250 C1   1/1990
JP   S61-108813 U   7/1986
(Continued)

OTHER PUBLICATIONS

Extended European Search Report, dated Apr. 12, 2018, 5 pages.

*Primary Examiner* — Michael R Mansen
*Assistant Examiner* — Robert T Reese
(74) *Attorney, Agent, or Firm* — Foley & Lardner LLP

(57) ABSTRACT

Disclosed is a structure for attachment of a drain nut to a synthetic resin cover. The cover has a nut engagement portion formed in an outer surface of the cover, a cylindrical engagement portion formed with a plurality of piece parts on an inner surface of the cover, and a stepped portion formed between the nut and cylindrical engagement portions. The drain nut has a nut portion engaged in the nut engagement portion, a female thread portion formed in the nut portion for screw-in of a drain plug, a cylindrical portion formed concentrically with the nut portion and engaged in the cylindrical engagement portion, a large-diameter portion formed between the nut and cylindrical portions and engaged in the stepped portion, with an O-ring held between the large-diameter portion and stepped portion, and a collar portion formed around the cylindrical portion and retained by front ends of the piece parts.

6 Claims, 10 Drawing Sheets

(51) Int. Cl.
 F16N 31/00 (2006.01)
 B62D 29/04 (2006.01)
(52) U.S. Cl.
 CPC ............ F16N 31/00 (2013.01); *B62D 29/041* (2013.01); *F01M 2011/0416* (2013.01)

(56) References Cited

U.S. PATENT DOCUMENTS

| | | | |
|---|---|---|---|
| 2009/0218168 A1* | 9/2009 | Diehl | F01M 11/0408 184/1.5 |
| 2011/0284539 A1 | 11/2011 | Stevenson | |
| 2016/0252191 A1* | 9/2016 | Dillon | F16K 27/067 137/1 |

FOREIGN PATENT DOCUMENTS

| | | |
|---|---|---|
| JP | 2012-255373 A | 12/2012 |
| WO | WO-2011/008261 A1 | 1/2011 |

* cited by examiner

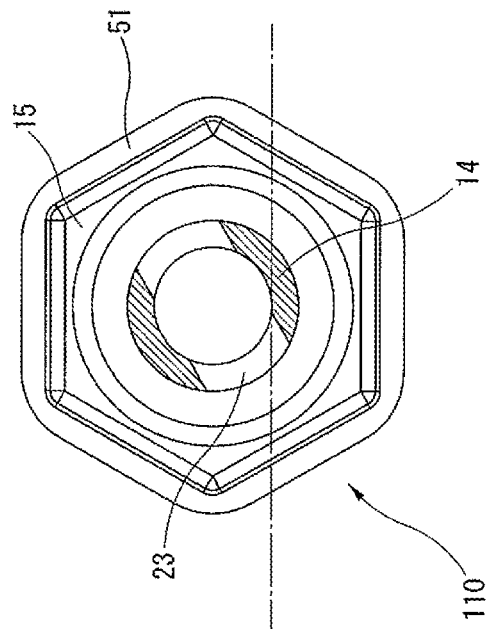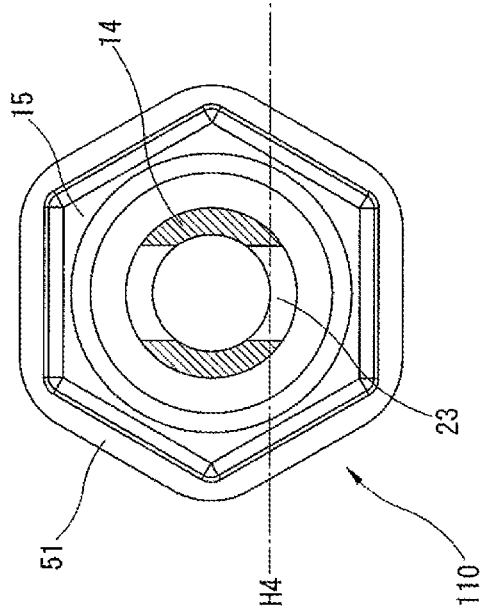

DRAIN NUT ATTACHMENT STRUCTURE FOR SYNTHETIC RESIN COVER

BACKGROUND OF THE INVENTION

The present invention relates to a drain nut attachment structure for a synthetic resin cover that is suitable as an oil pan of an internal combustion engine or automatic transmission etc.

Although oil pans made of steel are generally widely used in internal combustion engines, there has recently been made an attempt to use oil pans made of synthetic resins such as FRP (fiber-reinforced plastics). The oil pan of the internal combustion engine needs to be equipped with a detachable screw-in drain plug so as to drain oil from the inside of the oil pan.

For example, Japanese Laid-Open Patent Publication No. 2012-255373 (abbreviated as JP 2012-255373 A) discloses a drain plug installing structure for a synthetic resin oil pan, which includes a metal drain nut attached to the oil pan from the inside of the oil pan and a drain plug screwed in a female thread portion of the drain nut from the outside of the oil pan. More specifically, the drain nut is unrotatably fixed to the oil pan by engaging a hexagonal nut portion of the drain nut in a hexagonal nut engagement portion of the oil pan, with a cylindrical portion of the drain nut passing through a through hole of the oil pan, and tightening the drain plug to the cylindrical portion of the drain nut.

An O-ring is provided as a radial seal between the oil pan and the drain nut, while there is a slight radial clearance left between other parts of the oil pan and the drain nut. The drain nut is thus arranged concentrically with the nut engagement portion of the oil pan by the self-centering action due to elasticity of the O-ring so that the O-ring can establish good sealing throughout its entire circumference.

SUMMARY OF THE INVENTION

In the above drain plug installing structure, however, it is necessary to tighten the drain plug to the drain nut in a state where the drain nut has been assembled to the oil pan from the inside of the oil pan and thereby temporarily fixed so as not to fall off from the oil pan. This assembling operation is complicated. In addition, the workability of the assembling operation is low because there is not enough space to place a tool for assembling the drain nut in view of the facts that: the inside of the oil pan is formed into a three-dimensional box shape for accumulation and storage of oil; and peripheral components such as baffle plate and oil strainer are disposed adjacent to the inside of the oil pan.

For ease of detachment of the drain plug, JP 2012-255373 A discloses one embodiment of the drain plug installing structure, which includes a mechanism for preventing fall-off of the drain nut by e.g. forming a radially inwardly protruding engagement protrusion on a tip end of the nut engagement portion and engaging the engagement protrusion with an end edge of the nut portion. In the oil pan, however, the though hole of smaller diameter is formed continuous to a bottom surface of the nut engagement portion. The formation of such a radially inward engagement protrusion in the nut engagement portion means to develop so-called undercuts, which make it difficult to the oil pan from the forming die. The structure of the forming die is consequently complicated to cause an increase in the production cost of the oil pan.

It is accordingly an object of the present invention to provide a drain nut attachment structure capable of allowing easy attachment of a metal drain nut to a synthetic resin cover while achieving a cost reduction of the synthetic resin cover.

According to one aspect of the present invention, there is provided a drain nut attachment structure comprising: a synthetic resin cover; and a drain nut made of a metal material and attached to the synthetic resin cover, wherein the drain nut comprises:

a nut portion having a noncircular outer circumferential surface;

a female thread portion formed in the center of the nut portion such that a drain plug is screwed in the female thread portion;

a cylindrical portion formed concentrically with the nut portion; and a large-diameter portion formed coaxially between the nut portion and the cylindrical portion and having a cylindrical outer circumferential surface larger in diameter than the cylindrical portion and smaller in diameter than the out portion, wherein the synthetic resin cover comprises:

a nut engagement portion formed in a noncircular shape to be open to an outer surface of the synthetic resin cover such that the nut portion is engaged in the nut engagement portion;

a stepped portion formed to be open to a bottom surface of the nut engagement portion and having a cylindrical inner circumferential surface;

a though hole formed to be open at one end thereof to a bottom surface of the stepped portion; and a cylindrical engagement portion formed on the inner surface of the synthetic resin cover and having a plurality of piece parts disposed circumferentially at predetermined intervals in an annular arrangement around the through hole, wherein an O-ring is arranged to establish a radial seal between the inner circumferential surface of the stepped portion and the outer circumferential surface of the large-diameter portion, and wherein the drain nut further comprises a collar portion formed on a front end of the cylindrical portion and protruding radially outwardly from the cylindrical portion so as to be retained by front ends of the piece parts.

In this structure, it is possible to assemble and attach the drain nut to the synthetic resin cover by easy operation of inserting the drain nut into the nut engagement portion of the synthetic resin cover and pushing the drain nut into the cylindrical engagement portion of the synthetic resin cover with the use of an appropriate assembling tool. As the collar portion is engaged with and retained by the front ends of the piece parts, the drain nut is axially locked in position so as not to fall off from the synthetic resin cover. Further, the drain nut is assembled to the synthetic resin cover from the outside of the synthetic cover. The outside of the synthetic resin cover is simple in configuration; and there is enough space to place the assembling tool in the outside of the synthetic resin cover. It is thus possible to improve the workability of the assembling operation of the drain nut as compared with the drain nut is assembled to the synthetic resin cover from the inside of the synthetic cover. Since both of the drain nut and the drain plug are assembled from the outside of the synthetic resin cover, the drain nut to which the drain plug has been tightened can be attached to the synthetic resin cover.

In order for the drain nut to be attached to the synthetic resin cover from the outside of the synthetic resin cover, the drain nut engagement part of the synthetic resin cover is shaped to gradually decrease in inner radial dimension (diameter) from the outside to the inside, i.e., in the order from the nut engagement portion, the stepped portion, the cylindrical engagement portion (through hole). At the time of forming the synthetic resin cover in a for wing die, there do not occur projecting or recessed undercuts that makes it difficult to separate the synthetic resin cover from the forming die. It is thus possible to reduce the production cost of the synthetic resin cover.

In a preferred aspect of the present invention, the cylindrical portion has at least two drain holes formed therethrough from an inner circumferential surface to an outer circumferential surface of the cylindrical portion at positions opposed to each other in a diameter direction.

It is possible in this structure to, in the case where fluid (such as oil) is drained from the inside of the synthetic resin cover upon detachment of the drain plug from the drain nut, reliably drain the fluid through the drain holes and sufficiently reduce the amount of the fluid remaining in the synthetic resin cover after fluid drain operation. Since these two drain holes are opposed in position in the diameter direction, at least one of the drain holes is located downward so as to ensure reliable drain of the fluid irrespective of the rotational position of the drain nut relative to the synthetic resin cover. At the time of assembling the drain nut to the synthetic resin cover, there is no need to specify the rotational position of the drain nut.

In another preferred aspect of the present invention, the piece parts include radially inwardly protruding hooks provided on the front ends thereof; each of the hooks has a tapered surface formed on an inner circumferential side thereof and inclined radially inwardly toward the front; and the collar portion has a tapered surface formed on an outer circumferential side thereof and inclined radially inwardly toward the front.

At the time of assembling the drain nut to the synthetic resin cover by inserting and pushing the drain nut from the outside of the synthetic resin cover, the tapered surface of the collar portion is brought into sliding contact with the tapered surfaces of the hooks so that the piece parts can be easily deformed in the diameter-increasing direction along the tapered surface of the collar portion. It is thus possible to easily fit the front ends of the piece parts (hooks) to the collar portion.

In still another preferred aspect of the present invention, the drain nut further comprises a second collar portion protruding radially outwardly from the outer circumferential surface of the nut portion so as to cover a slight clearance between the nut portion and the nut engagement portion from the outside of the synthetic resin cover. In this case, the synthetic resin cover may preferably comprise a recess portion formed in the outer surface thereof such that an outer circumferential edge of the second collar portion is engaged in the recess portion. The synthetic resin cover may preferably comprise a protruding portion protruding from the outer surface thereof according to an outer shape of the second collar portion such that the recess portion is defined by the protruding portion.

It is possible by the second collar portion to suppress the entry of dust or foreign substance into the clearance between the nut portion and the nut engagement portion and thereby prevent deterioration in the seal performance of the O-ring due to adhesion of dust or foreign substance. It is possible to more reliably suppress the entry of dust or foreign substance by engagement of the second collar portion in the recess portion. When the recess portion is defined by the protruding portion, the protruding portion blocks any foreign substance or liquid drop coming down along the outer surface of the synthetic resin cover so that it is possible by the producing portion to more reliably prevent the entry of such foreign substance or liquid into a clearance between the second collar portion and the recess portion.

As mentioned above, the present invention allows easy attachment of the drain nut to the synthetic resin cover and cost reduction of the synthetic resin cover.

The other objects and features of the present invention will also become understood from the following description.

BRIEF DESCRIPTION OF DRAWINGS

FIGS. 15A and 15B are schematic views showing the level of oil remaining in the oil pan according to the second embodiment of the present invention.

DESCRIPTIONS OF EMBODIMENTS

Figure 1:
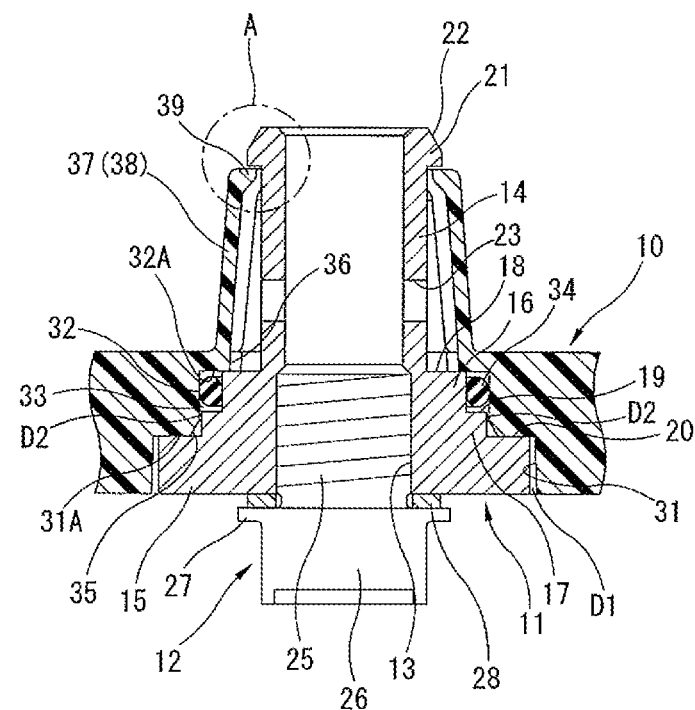
FIG. 1 is a cross-sectional view of a drain nut attachment structure for attachment of a drain nut to an oil pan (as a synthetic resin cover) according to a first embodiment of the present invention.

The first embodiment of the first invention will be now described below with reference to FIGS. 1 to 4, 5A to 5D and 6 to 7. A drain nut attachment structure of the first embodiment is adapted to attach a drain nut 11 to an oil pan 10, which is disposed on a bottom part of an internal combustion engine in a vehicle, such that a drain plug 12 is detachably coupled to the oil pan 10 via the drain nut 11 as shown in FIGS. 1 to 4.

In the following description, the terms "outer" and "inner" are used with respect to the oil pan 10. The upper and lower sides of FIG. 1 correspond to inner and outer sides of the oil pan 10, respectively. Further, the terms "front" and "rear" are used with respect to the direction of insertion of the drain nut 11 into the oil pan 10.

The oil pan 10 is made of a synthetic resin material (as a synthetic resin cover) and is integrally formed in one piece by e.g. injection molding. Examples of the synthetic resin material are high-strength/rigidity synthetic resins such as fiber-reinforced polyaramide plastics.

The drain nut 11 is made of a metal material and is attached to a bottom wall of the oil pan 10 at an appropriate position e.g. the lowest point in a vehicle-mounted state.

The drain plug 12 is also made of a metal material and is tightened to the drain nut 11.

More specifically, the drain nut 11 includes: a nut portion 15; a female thread portion 13 formed in the center of the nut portion 15; a cylindrical portion 14 formed on a front end side of the nut portion 15 concentrically with the female thread portion 13 and the nut portion 15; and two large-diameter portions 16 and 17 formed coaxially in a stepwise manner between the cylindrical portion 14 and the nut portion 15. In other words, the drain nut 11 is shaped such that the outer diameter of the drain nut 11 stepwise increases from the cylindrical portion 14 toward the nut portion 15, i.e., in the order from the cylindrical portion 14, the first large-diameter portion 16 to the second large-diameter portion 17. The nut portion 15 has a noncircular, polygonal outer circumferential surface. In the first embodiment, the outer circumferential surface of the nut portion 15 is hexagonal in cross section. On the other hand, each of the cylindrical portion 14 and the large-diameter portions 16 and 17 has a cylindrical outer circumferential surface.

A step surface 18 is provided between the cylindrical portion 14 and the first large-diameter portion 16. A step surface 19 is provided between the first large-diameter portion 16 and the second large-diameter portion 17. A step surface 20 is provided between the second large-diameter portion 17 and the nut portion 15. Each of these step surfaces 18, 19 and 20 is defined as a flat plane in a direction perpendicular to a center line of the female thread portion 13.

The drain nut 11 further includes a collar portion 21 formed on and protruding radially outwardly from a front end of the cylindrical portion 14. In the first embodiment, the collar portion 21 has a trapezoidal or triangular cross-sectional shape including: a tapered surface 22 defined on an outer circumferential side of the collar portion 21 and inclined radially inwardly toward the front; and a flat stopper surface 21A defined on a back end side of the collar portion 21 and extending to the cylindrical portion 14 in the direction perpendicular to the center line of the female thread portion 13.

Two drain holes 23 are formed through the cylindrical portion 14 so as to be opposed in position to each other in the diameter direction of the cylindrical portion 14 and each extend from the inner circumferential surface to the outer circumferential surface of the cylindrical portion 14. These drain holes 23 are located at positions relatively near the nut portion 15.

The drain plug 12 includes: a male thread portion 25 screwed into the female thread portion 13; a hexagonal head portion 26 formed on a back end side of the male thread portion 25; and a flange portion 27 formed in a circular shape around a front end side of the head portion 26. A back end surface of the flange portion 27 (hereinafter also referred to as "flange surface") is made larger in diameter than a screw hole of the female thread portion 13. The drain plug 12 is secured to the drain nut 11 with an annular gasket 28 disposed around the male thread portion 25.

As the gasket 28, there can be used a flat seal washer made of a relatively soft metal material such as plastically deformable copper. Any other type of washer such as nonmetallic gasket can alternatively be used as the gasket 28. The gasket 28 is held and compressed between the high-rigidity end surfaces of the nut portion 15 of the drain nut 11 and of the flange portion 27 of the drain plug 12.

The oil pan 10 includes a nut engagement portion 31 formed to be open to an outer surface thereof exposed to the outside of the vehicle (more specifically, a lower surface of the bottom wall of the oil pan). The nut engagement portion 31 has a noncircular, polygonal shape corresponding to the outer circumferential shape of the nut portion 15 of the drain nut 11. In the first embodiment, the nut engagement portion 31 is formed as a hexagonal recess in the thick bottom wall of the oil pan 10. A distance between two opposite sides of the hexagonal nut engagement portion 31 is made slightly larger than a distance between two opposite sides of the hexagonal nut portion 15. The nut portion 15 is thus engaged in the nut engagement portion 31, with a slight radial clearance D1 left between the nut portion 15 and the nut engagement portion 31.

The oil pan 10 also includes a cylindrical stepped portion 32 formed open to a bottom surface (inner end surface) 31A of the nut engagement portion 31. The stepped portion 32 has: a bottom surface (inner end surface) 32A in parallel with the bottom surface 31A of the nut engagement portion 31; and a cylindrical inner circumferential wall surface. A diameter of the stepped portion 32 is made slightly larger than a diameter of the second large-diameter portion 17 and much larger than a diameter of the first large-diameter portion 16. The large-diameter portions 16 and 17 are thus engaged in the stepped portion 32, with a relatively large clearance left between the first large-diameter portion 16 and the stepped portion 32 as a space 33 for accommodation of the after-mentioned O-ring 34 and with a slight clearance D2 left between the second-large diameter portion 17 and the stepped portion 32. Although the diameter of the stepped portion 32 is smaller than the distance between two opposite sides of the hexagonal nut engagement portion 31 in the illustrated example, the diameter of the stepped portion 32 may be substantially equal to the distance between two opposite sides of the hexagonal nut engagement portion 31.

In view of the workability of assembling of the drain nut 11 to the oil pan 10, a diagonally inclined or curved chamfered surface 31 is provided on a corner between the nut engagement portion 31 and the stepped portion 32.

A through hole 36 is formed in the oil pan 10 concentrically with the stepped portion 32 and open at one end thereof to the bottom surface 32A of the stepped portion 32 and at the other end thereof to the outer surface of the oil pan 10.

The oil pan 10 further includes a cylindrical engagement portion 38 formed with a plurality of piece parts 37 on an inner surface of the bottom wall of the oil pan. These piece parts 37 are disposed circumferentially in an annular arrangement at predetermined intervals around the through hole 36. In the first embodiment, each of the piece parts 37 has an elongated (slip-like) shape bent at substantially a right angle from the inner surface of the bottom wall of the oil pan 10 and protruding upwardly in a slightly inwardly inclined direction. Further, the piece parts 37 are curved with a predetermined radius of curvature along the circumferential direction. Thus, the cylindrical engagement portion 38 as a whole has a substantially cylindrical inner circumferential surface such that the cylindrical portion 14 is engaged in the cylindrical engagement portion 38.

In the first embodiment, radially inwardly protruding hooks 39 are respectively provided on front ends of the piece parts 37. Each of the hooks 39 has an inverted triangle cross-sectional shape including: a tapered surface 40 defined on an inner circumferential side thereof and inclined radially inwardly toward the front (as in the case of the tapered surface 22 of the collar portion 21); and a front end surface (inner end surface) 41 aligned in parallel with the inner and outer surfaces of the bottom wall of the oil pan 10.

In an assembled state where the drain nut 11 is properly engaged in the nut engagement portion 31 of the oil pan 10, the first large-diameter portion 16 of the drain nut 11 is covered by the stepped portion 32 of the oil pan 10. The annular continuous O-ring accommodation space 33 is hence defined between the oil pan 10 and the drain nut 11 as mentioned above. The oil pan accommodation space 33 is rectangular in cross section and is surrounded by four surfaces, i.e., the inner circumferential surface of the stepped portion 32, the outer circumferential surface of the first large-diameter portion 16, the step bottom surface 32A of the oil pan 10 and the step surface 19 of the drain nut 11.

As the O-ring 34, an ordinary O-ring made of silicone rubber etc. is arranged in the O-ring accommodation space 33. In the assembled state, the O-ring 34 is held and compressed between the inner circumferential surface of the stepped portion 32 and the outer circumferential surface of the first large-diameter portion 16 so as to establish a radial seal between the stepped portion 32 and the first large-diameter portion 16.

Figure 2:
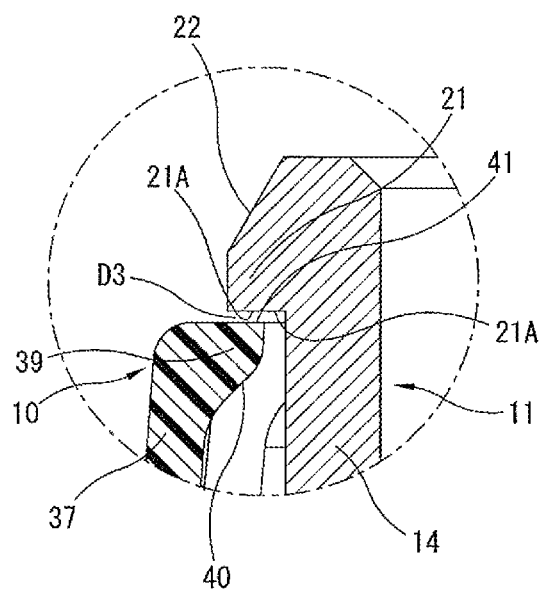
FIG. 2 is an enlarged view of area A of FIG. 1.
Figure 3:
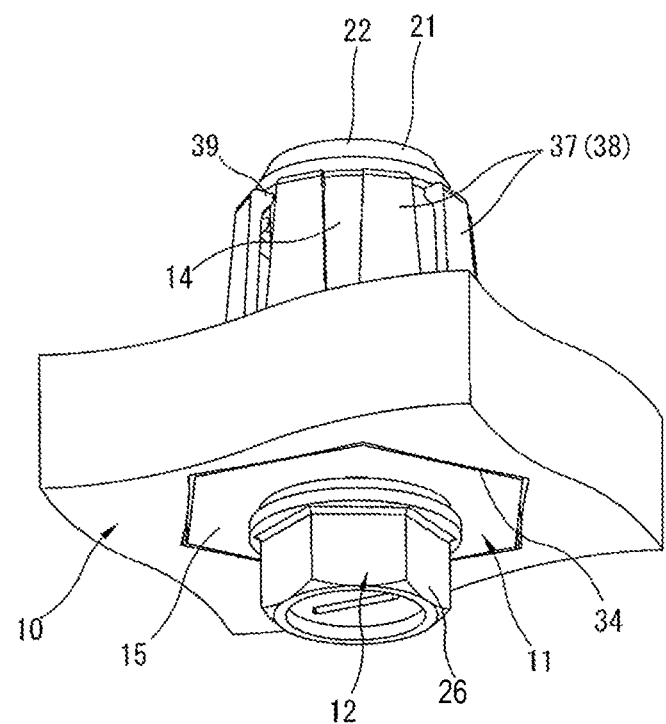
FIG. 3 is a perspective view of the drain nut attachment structure according to the first embodiment of the present invention.
Figure 5A:
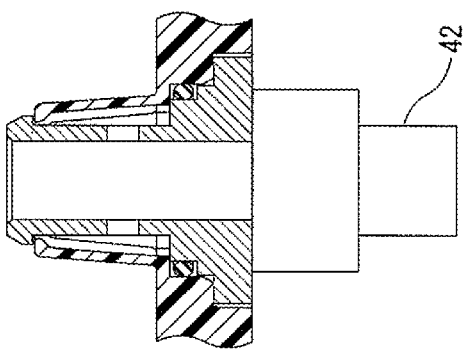
FIGS. 5A to 5D are schematic views showing a process of assembling the drain nut to the oil pan according to the first embodiment of the present invention.
Figure 5B:
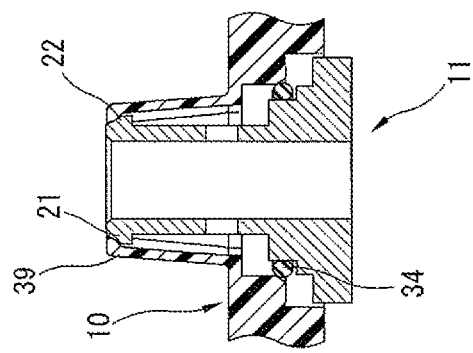
Figure 5C:
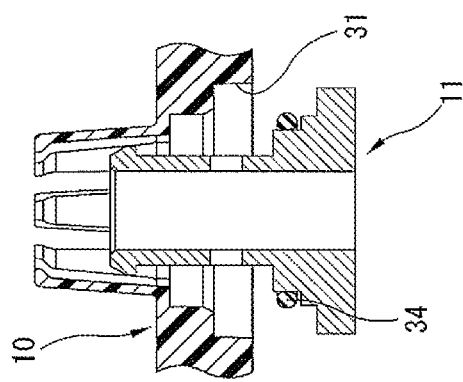
Figure 5D:
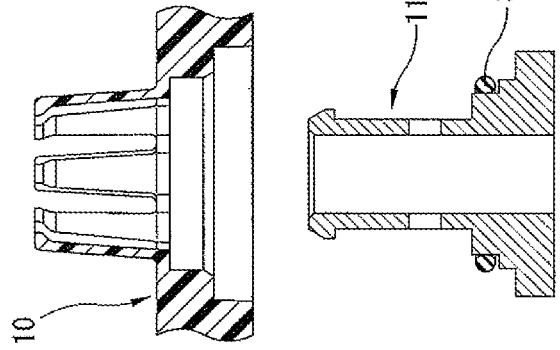

In the first embodiment, the drain nut 11 and the drain nut 12 are assembled to the oil pan 10 by the following procedure. First, the O-ring 34 is disposed around the large-diameter portion 16 of the drain nut 11 as shown in FIG. 5A. The drain nut 11 is then inserted from the outside of the oil pan 10 into the nut engagement portion 31 as shown in FIG. 5B. By further insertion of the drain nut 11, the tapered surface 22 of the collar portion 21 of the drain nut 11 is brought into the tapered surfaces 40 of the piece parts 37 (hooks 39) of the oil pan 10 as shown in FIG. 5C. When the drain nut 11 is further pushed by the use of an appropriate assembling tool 42 such as air cylinder, the piece parts 37 of synthetic resin are elastically deformed in the diameter-increasing direction so that the tapered surfaces 40 of the piece parts 37 are forced open by the tapered surface 22 of the collar portion 21. When the collar portion 21 is pushed over the hooks 39 of the piece parts 37, the elastically deformed piece parts 37 return to their original shape so that the hooks 39 fit in the back end side of the collar portion 21 and thereby retain the collar portion 21 shown in FIG. 5D. In this state, the stopper surface 21A of the drain nut 11 faces the front end surfaces 41 of the piece parts 37 via a slight clearance D3 as also shown in FIG. 2. As the stopper surface 21A of the collar portion 21 is engaged with and retained by the front end surfaces 41 of the piece parts 37, the drain nut 11 is axially locked in position so as to prevent fall-off of the drain nut 11 from the oil pan 10. In this way, the drain nut 11 can be easily attached to the oil pan 10 via a snap-fit connection only by insertion and push. The drain plug 12 is tightened to the drain nut 11 by screwing the male thread portion 25 into the female screw portion 13.

As explained above, the drain nut 11 is assembled and attached to the oil pan 10 from the outside of the oil pan 10 in the first embodiment. The outside of the oil pan 10 (i.e. the vicinity of the outer surface of the bottom wall of the oil pan 10) is simple in configuration. There is enough space to place the assembling tool in the outside of the oil pan 10. It is thus possible to improve the workability of the assembling operation of the drain nut 11 as compared to the case where the drain nut is assembled to the oil pan from the inside of the oil pan. Since both of the drain nut 11 and the drain plug 12 are assembled from the outside of the oil pan 10, the drain nut 11 to which the drain plug 12 has been tightened can be attached to the oil pan 10.

In order for the drain nut 11 to be attached to the oil pan 10 from the outside of the oil pan 10, the drain nut engagement part of the oil pan 10 (in which the drain nut 10 is engaged) is shaped to gradually decrease in inner radial dimension (diameter) from the outside to the inside, i.e., in the order from the nut engagement portion 31, the stepped portion 32, the cylindrical engagement portion 38 (though hole 36) and the hooks 39. At the time of forming the oil pan 10 in a forming die, there do not occur projecting or recessed undercuts that makes it difficult to separate the oil pan 10 from the forming die. It is thus possible to easily produce the oil pan 10 at lower cost.

The radial dimensions of the drain nut 11 and the oil pan 10 are set such that, in the assembled state where the drain nut 11 is assembled to the oil pan 10, the drain nut 11 and the oil pan 10 are brought into contact with each other substantially only via the O-ring 34 while there are some appropriate clearance left between the other parts of the drain nut 11 and the oil pan 10, e.g., between the nut portion 15 and the nut engagement portion 31, between the second large-diameter portion 17 and the stepped portion 32 and between the cylindrical portion 14 and the cylindrical engagement portion 38. In this arrangement, the drain nut 11 is radially movable with the drain plug 12 within the range of such clearance. Namely, the drain nut 11 is set in position by the self-centering action due to elasticity of the O-ring 34. The drain nut 11 with the drain plug 12 is always kept concentric with the inner circumferential surface of the stepped portion 32; and the outer circumferential surface of the first large-diameter portion 16 is always kept at a constant radial distance apart from the inner circumferential surface of the stepped portion 32 throughout the entire circumference. It is thus possible for the O-ring 34 to maintain good sealing between the drain nut 11 and the oil pan 10 throughout the entire circumference. The problem of oil spread or leakage does not occur even though there is a relative difference in thermal expansion coefficient between the synthetic resin oil pan 10 and the metal drain nut 11.

On the other hand, the axial dimensions of the drain nut 11 and the oil pan 10 are set such that, when the step surface 20 of the nut portion 15 is brought into contact with the bottom surface 31A of the nut engagement portion 31, the stopper surface 21A of the collar portion 21 is opposed to and faces the front end surfaces 41 of the piece parts 37 (hooks 39) via the slight clearance D3. It is thus possible to prevent excessive compressive load from being exerted on the bottom wall of the oil pan 10 even if there arise slight variations in the dimensions of the respective parts. In this arrangement, the oil nut 11 is movable relative to the oil pan 10 within the range of the slight clearance D3. In reality, however, there does not occur axial rattle of the oil nut 11 relative to the oil pan 10 because the O-ring 34 is radially compressed and held between the drain nut 11 and the oil pan 10.

The drain plug 12 is tightened to the drain nut 11 with a predetermined standard tightening torque. The gasket 28 is held and compressed between the flange surface of the drain plug 12 and the end surface of the drain nut 11 so that the space between the drain plug 12 and the drain nut 11 is radially sealed by the gasket 28. Since both of the drain plug 12 and the drain nut 11 are made of metal and are high in rigidity, it is possible to assuredly apply required axial force to the gasket 28 and maintain good sealing between the drain plug 12 and the drain nut 11 by the gasket 28. This axial force does not act on the oil pan 10 and does not exert compressive load on the bottom wall of the oil pan 10.

Figure 6:
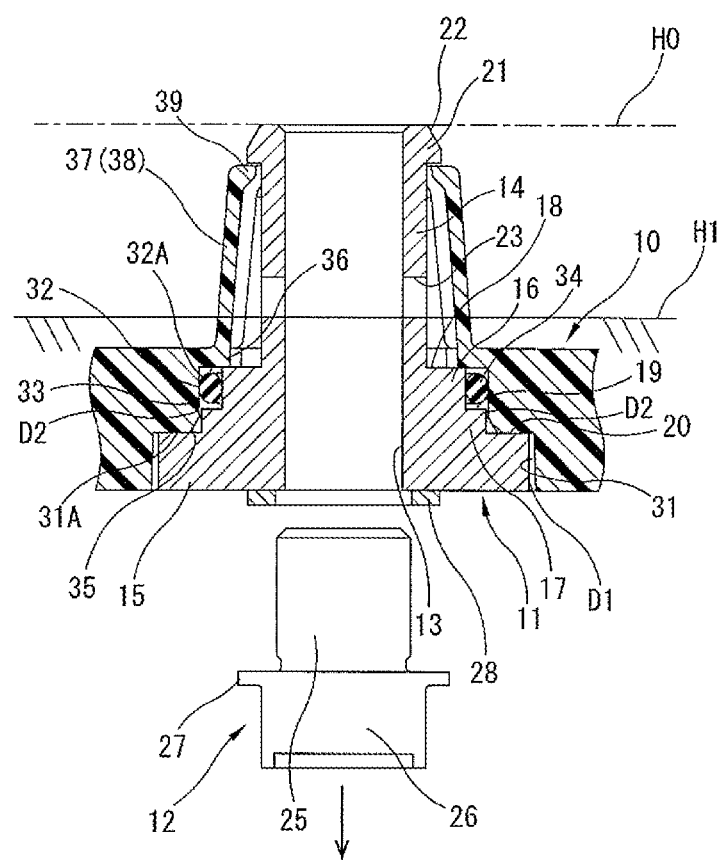
FIG. 6 is a schematic view showing the level of oil remaining in the oil pan after oil drain operation, in the case where the oil pan is arranged horizontally, according to the first embodiment of the present invention.

In the case where the oil pan 10 is horizontally mounted on the vehicle (that is, the bottom wall of the oil pan 10 is aligned in parallel with a horizontal plane) as shown in FIG. 6, the level of oil remaining in the oil pan 10 is substantially in parallel with the horizontal plane. If no drain holes 23 are provided, the oil level H0 is nearly the same as the height of the front end of the drain nut 11. In this case, there remains a large amount of oil in the oil pan 10. In the first embodiment, however, two drain holes 23 are provided in the cylindrical portion 14 of the drain nut 11 at positions relatively near the nut portion 15. As the oil is drained through these drain holes 23, the oil level H1 becomes sufficiently low at nearly the same level as the height of the drain holes 23. It is thus possible to sufficiently decrease the amount of oil remaining in the oil pan 10 by lowering the oil level from H0 to H1.

Figure 7:
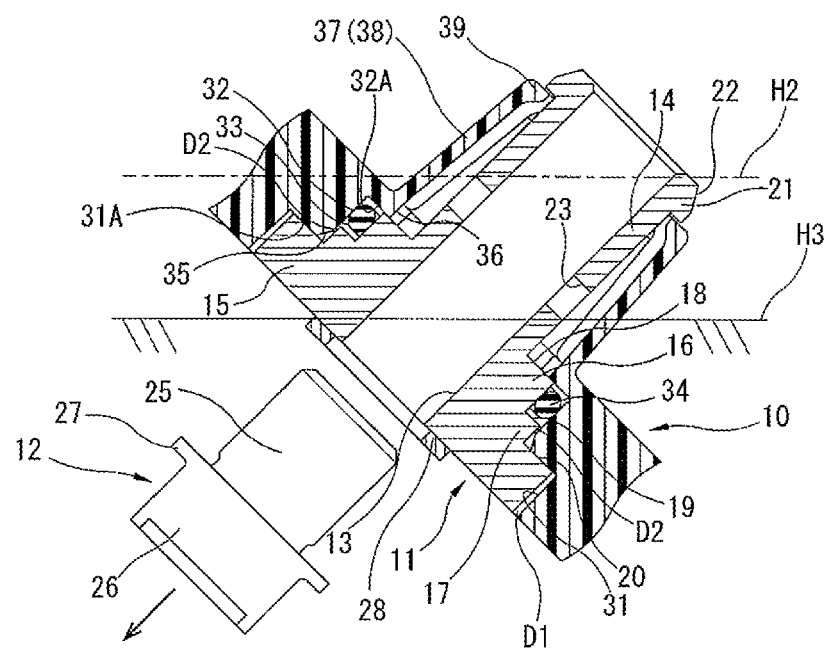
FIG. 7 is a schematic view showing the level of oil remaining in the oil pan after oil drain operation, in the case where the oil pan is arranged in an inclined manner, according to the first embodiment of the present invention.

In the case where the oil pan 10 is mounted on the vehicle in an inclined manner (that is, the bottom wall of the oil pan 10 is inclined with respect to a horizontal plane) as shown in FIG. 7, the level of oil remaining in the oil pan 10 is inclined with respect to the horizontal plane. If no drain holes 23 are provided, the oil level H2 is nearly the same as the height of the front end of the drain nut 11. In this case, there remains a large amount of oil in the oil pan 10. In the first embodiment, however, two drain holes 23 are provided in the cylindrical portion 14 at positions opposed to each other in the diameter direction. Irrespective of the rotational position of the drain nut 11 relative to the oil pan 10, at least one of the drain holes 23 is located downward. As the oil is drained though at least the downward drain hole 23, the oil level H3 becomes sufficiently low at nearly the same level as the height of the downward drain hole 23. It is thus also possible to sufficiently decrease the amount of oil remaining in the oil pan 10 by lowering the oil level from H2 to H3. There is no need to specify the rotational position of the drain nut 11 at the time of assembling the drain nut 11 to the oil pan 10.

The number of the drain holes 23 is not limited to two. It is alternatively feasible to provide three or more drain holes 23 in the cylindrical portion 14 of the drain nut 11. Further, the shape of the drain holes 23 is not limited to be circular. The drain holes 23 may alternatively be e.g. elongated in shape in the circumferential direction of the cylindrical portion 14.

Although the nut portion 15 of the drain nut 11 is hexagonal is shape in the first embodiment, the shape of the nut portion 15 is not limited to such a hexagonal shape. The nut portion 15 can be of any shape as long as the drain nut 11 is held in the oil pan 10 without rotation so as to withstand the tightening torque of the drain plug 12. For example, the nut portion 15 may be formed in a quadrilateral, star-like shape etc. or may be formed in a recess-projection fitting shape such as serrated shape or splined shape.

Next, the second embodiment of the first invention will be now described below with reference to FIGS. 8 to 12. A drain nut attachment structure of the second embodiment is structurally similar to that of the first embodiment. In the second embodiment, the same parts and portions as those in the first embodiment are designated by like reference numerals; and duplicate description thereof is omitted herefrom.

Figure 8:
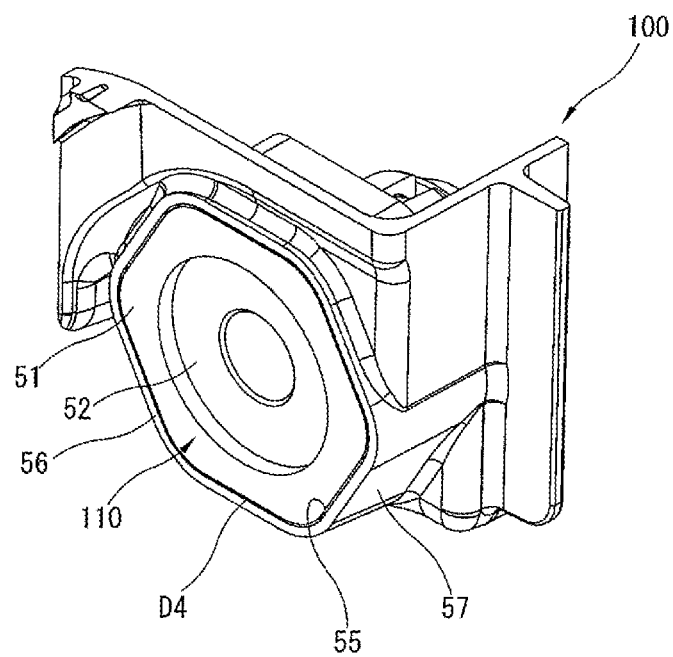
FIG. 8 is a perspective view of a drain nut attachment structure for attachment of a drain nut to an oil pan (as a synthetic resin cover) according to a second embodiment of the present invention.
Figure 9:
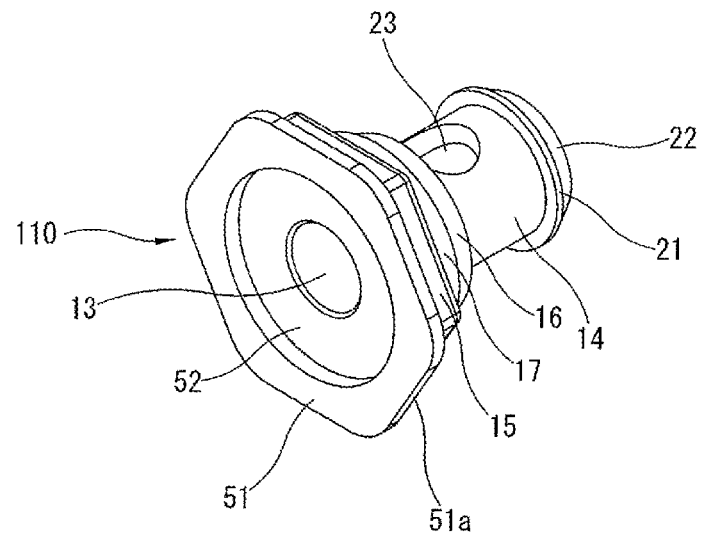
FIG. 9 is a perspective view of the drain nut according to the second embodiment of the present invention.
Figure 10:
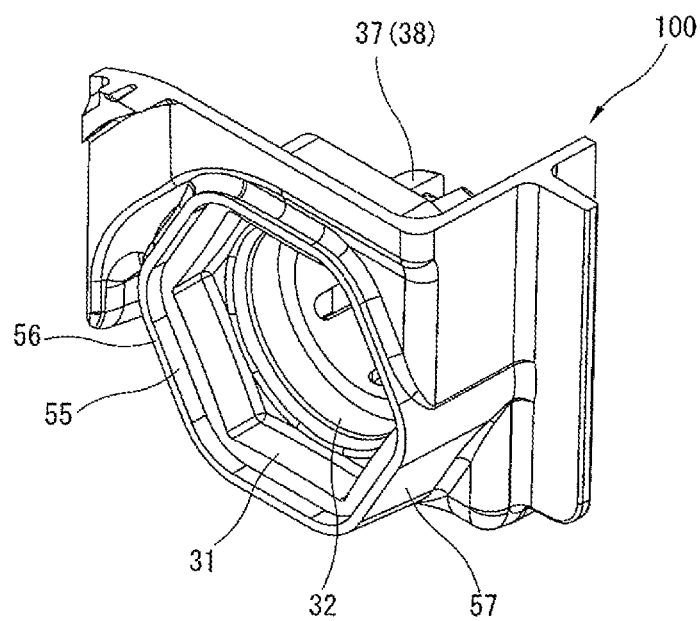
FIG. 10 is a perspective view of the oil pan according to the second embodiment of the present invention.
Figure 11:
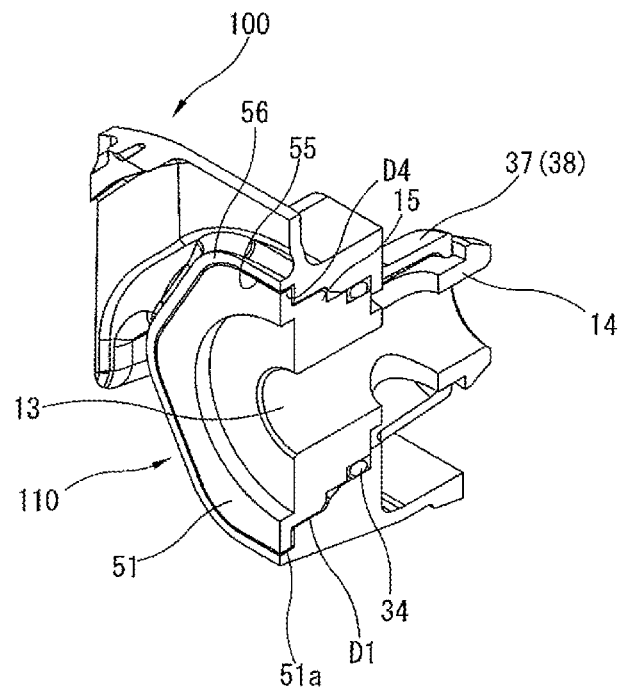
FIG. 11 is a partially cutaway cross-sectional perspective view of the drain nut attachment structure according to the second embodiment of the present invention.

As shown in FIGS. 8 and 11, the drain nut attachment structure of the second embodiment is adapted to attach a drain nut 110 to an oil pan 100 such that a drain plug 12 is detachably coupled to the oil pan 100 via the drain nut 110. As shown in FIGS. 9 and 10, the basic configurations of the drain nut 110 and the oil pan 100 of the second embodiment are similar to those of the drain nut 11 and the oil pan 10 of the first embodiment. The drain nut 110 includes a hexagonal nut portion 15. The oil pan 100 includes a hexagonal nut engagement portion 31. The nut portion 15 of the drain nut 110 is engaged in the nut engagement portion 31 of the oil pan 100 so as to withstand the tightening torque of the drain plug 12 as in the case of the first embodiment.

In the second embodiment, the drain nut 110 includes a second collar portion 51 formed on and protruding radially outwardly from the outer circumferential surface of the nut portion 15 along the back end side of the nut portion 15 so as to cover and surround a slight clearance D1 (see FIG. 11) between the nut portion 15 and the nut engagement portion 31 from the outside of the oil pan 100. The second collar portion 51 is similar in shape to the nut portion 15 and, more specifically, hexagonal in shape. Six corners of the hexagonal second collar portion 51 are rounded in a circular arc shape with an appropriate radius of curvature. In other words, the second collar portion 51 has a hexagonal outer shape larger than that of the hexagonal nut portion 51 according to the shape of the slight clearance D1 between the hexagonal nut portion 51 and the hexagonal nut engagement portion 31. As an outer circumferential edge 51A of the second collar portion 51 is kept at a given distance from the inner circumferential surface of the nut engagement portion 31, the slight clearance D1 is maintained constant throughout the entire circumstance.

Figure 4:
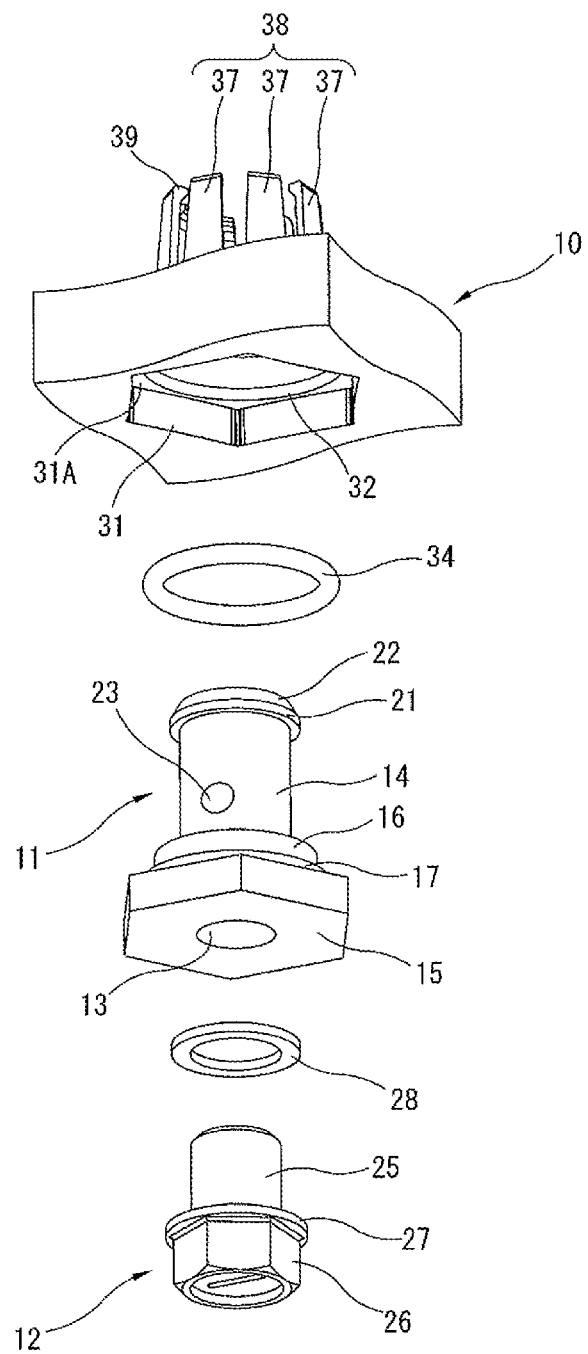
FIG. 4 is an exploded perspective view of the drain nut attachment structure according to the first embodiment of the present invention.
Figure 12:
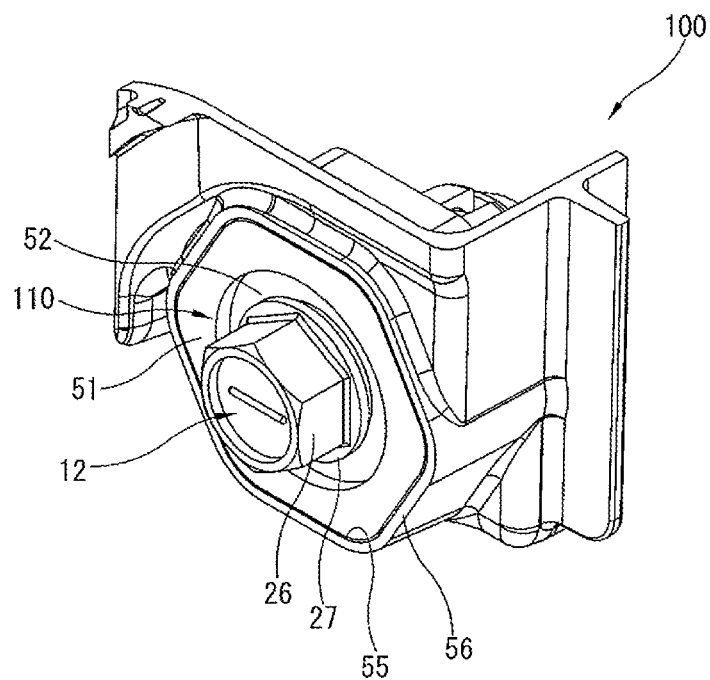
FIG. 12 is a perspective view of the drain nut attachment structure according to the second embodiment of the present invention.

As shown in FIG. 12, a circular seat surface 52 is provided on a part of the drain nut 110 inside the second collar portion 51 such that the head portion 26 (flange portion 27) of the drain plug 12 is pressed against the seat surface 51 via the gasket 28 (also see FIG. 4). Although the seat surface 52 is axially recessed relative to the outer end surface of the second collar portion 51 in the illustrated example, the seat surface 52 may be in the same plane as the outer end surface of the second collar portion 51.

The oil pan 100 includes a recess portion 55 in which the outer circumferential edge 51A of the second collar portion 51 is engaged via a slight clearance D4. As shown in FIG. 10, the recess portion 55 is axially continuous to the nut engagement portion 31 and hexagonal in shape corresponding to the outer shape of the second collar portion 51. In the second embodiment, the oil pan 100 further includes a protruding portion 56 formed continuously with a predetermined wall thickness and protruding from the outer surface of the oil pan 100 so as to surround the recess portion 55. The recess portion 55 is defined in a relatively recessed shape by forming the protruding portion 56 on the outer surface of the oil pan 100, rather than by making a recess in the outer surface of the oil pan 100. The protruding portion 56 is also hexagonal in shape corresponding to the outer shape of the second collar portion 51. In the illustrated example, a front (inner) side of the protruding portion 56 adjacent to the outer surface of the oil pan 10 is formed as a hexagonal cylindrical part 57 so as to surround the nut engagement portion 31 and the stepped portion 32.

Herein, the layout of the drain nut 110 is illustrated where the inclination of a center line of the drain nut 110 is close to horizontal (e.g. the center line of the drain nut 110 is inclined at an angle of 10° relative to a horizontal plane). In the second embodiment, the drain nut 110 is fixed to a peripheral edge region of the bottom wall of the oil pan 100, that is, a corner region between the bottom and lateral side walls of the oil pan 100.

The slight clearance D4 between the outer circumferential edge 51A of the second collar portion 51 and the protruding portion 56 (i.e. the inner circumferential edge of the recess portion 55) is set slightly larger than the slight clearance D1 between the nut 15 and the nut engagement portion 31 so that, when the tightening torque is exerted from the drain plug 12 to the drain nut 110, this torque does not act on the second collar portion 51.

As explained above, the slight clearance D1 between the nut portion 15 and the nut engagement portion 31 is covered by the second collar portion 51 in the second embodiment. The oil pan 100 of the internal combustion engine is situated near a road surface and is always exposed to dust or foreign substance (e.g. fine sand) blown up by vehicle wheels. The dust or foreign substance is thus likely to fly to the clearance D1. It is however possible by the second collar portion 51 to suppress the direct entry of such dust or foreign substance into the clearance D1 and thereby prevent deterioration in the seal performance of the O-ring 34 due to adhesion of dust or foreign substance.

In particular, the outer circumferential edge 51 of the second collar portion 51 is engaged in and radially surrounded by the recess portion 55. The path of entry of the dust or foreign substance is consequently bent like a labyrinth. It is thus possible to more reliably suppress adhesion of the dust or foreign substance to the O-ring 34 by engagement of the second collar portion 51 in the recess portion 55.

When the recess portion 55 is defined by the protruding portion 56 around the second collar portion 51 as in the second embodiment, the protruding portion 56 blocks any foreign substance or raindrop coming down along the outer surface of the oil pan 100. It is thus possible by the protruding portion 56 to more reliably prevent the entry of such foreign substance or liquid into the clearance D4 between the second collar portion 41 and the recess portion 55.

Since the recess portion 55 and the protruding portion 56 are formed on an outer circumferential side with respect to the nut engagement portion 31, there do not occur so-called undercuts at the time of forming the oil pan 100 in a forming die as in the case of the first embodiment.

In the second embodiment, the diameter of the drain holes 23 is set larger than that in the first embodiment in view of the case where the inclination of the center line of the drain nut 110 is close to horizontal (e.g. the center line of the drain nut 110 is inclined at an angle of 10° relative to a horizontal plane) in the mounted state. By setting the larger diameter of the drain holes 23, the level of oil remaining in the oil pan 100 after oil drain operation can be lowered to a tangent position H4 of the inner circumferential surface of the cylindrical portion 14 irrespective of the rotational orientation of the drain nut 110 (i.e. the circumferential positions of the drain holes 23) as shown in FIGS. 15A and 15B. Herein, two drain holes 23 are aligned in the vertical direction in FIG. 15A; whereas two drain holes 23 are displaced by 120° in FIG. 15B. The oil level H4 is substantially equal in both of the rotational orientations of FIGS. 15A and 15B. When the nut portion 15 of the drain nut 110 has a hexagonal shape as in the second embodiment, the rotational orientation of the drain nut 110 changes every 20°. After all, there is no change in the oil level H4 even when the drain nut 110 is attached in any rotational orientation.

In the second embodiment, the outer shape of the second collar portion 51 of the drain nut 110 is not necessarily similar to the outer shape of the nut portion 15. The second collar portion 51 can be of any shape.

Figure 13:
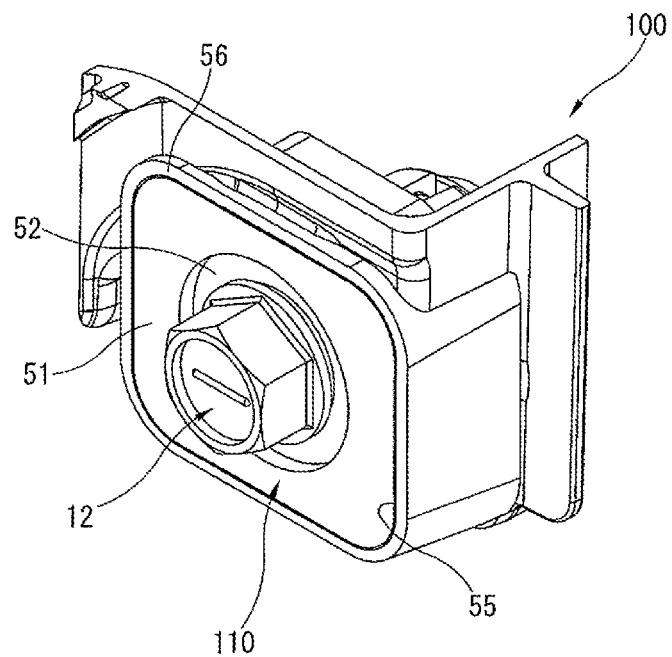
FIG. 13 is a perspective view showing a modified example of the drain nut according to the second embodiment of the present invention.

In one modification example, the second collar portion 51 of the drain nut 110 is formed in a quadrilateral shape as shown in FIG. 13. Even in this case, four corners of the quadrilateral second collar portion 51 are rounded in a circular arc shape. The protruding portion 56 of the oil pan 100 is shaped to define a rounded quadrilateral recess portion 55 corresponding to the outer shape of the second collar portion 51.

Figure 14:
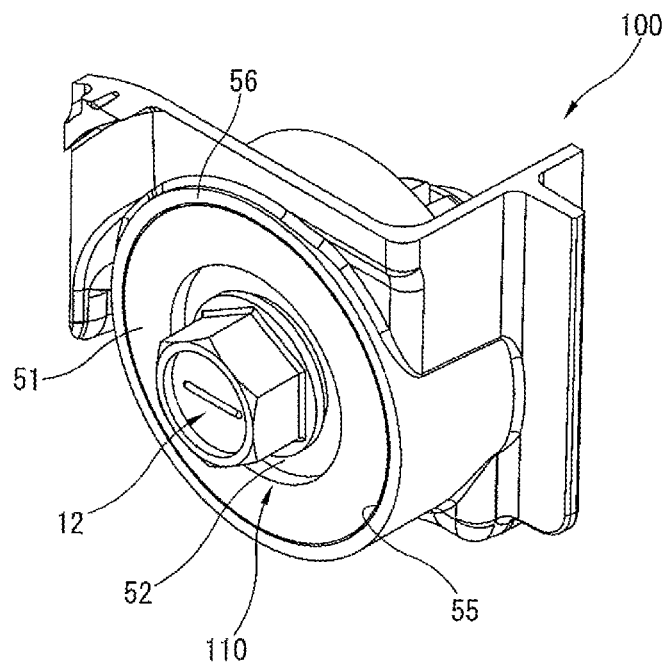
FIG. 14 is a perspective view showing another modified example of the drain nut according to the second embodiment of the present invention.

In another modification example, the second collar portion 51 of the drain nut 110 is formed into a circular shape as shown in FIG. 14. The protruding portion 56 of the oil pan 100 is shaped to define a circular recess portion 55 corresponding to the outer shape of the second collar portion 51.

The present invention is based on Japanese Patent Application No. 2016-233725 (filed on Dec. 1, 2016) and No. 2017-135114 (filed on Jul. 11, 2017) of which the entire contents are herein incorporated by reference.

Although the present invention has been described with reference to the above exemplary embodiments, it should be understood that the present invention is not limited to these exemplary embodiments. Various changes and modifications of the embodiments described above will occur to those skilled in the art in light of the above teachings. In the above embodiments, the present invention is applied to the oil pan 10, 110 of the internal combustion engine. The synthetic resin cover is however not limited to such an oil pan. The present invention is widely applicable to various synthetic resin covers of the type that needs a drain nut for mounting a drain plug.

The scope of the present invention is defined with reference to the following claims.

What is claimed is:
1. A drain nut attachment structure comprising:
a synthetic resin cover; and
a drain nut made of a metal material and attached to the synthetic resin cover,
wherein the drain nut comprises:
a nut portion having a noncircular outer circumferential surface;
a female thread portion formed in the center of the nut portion such that a drain plug is screwed in the female thread portion;
a cylindrical portion formed concentrically with the nut portion; and
a large-diameter portion formed coaxially between the nut portion and the cylindrical portion and having a cylindrical outer circumferential surface larger in diameter than the cylindrical portion and smaller in diameter than the nut portion,
wherein the synthetic resin cover comprises:
a nut engagement portion formed in a noncircular shape to be open to an outer surface of the synthetic resin cover such that the nut portion is engaged in the nut engagement portion;
a stepped portion formed to be open to a bottom surface of the nut engagement portion and having a cylindrical inner circumferential surface:
a though hole formed to be open at one end thereof to a bottom surface of the stepped portion; and a cylindrical engagement portion formed on the inner surface of the synthetic resin cover and having a plurality of piece parts disposed circumferentially at predetermined intervals in an annular arrangement around the through hole, wherein an O-ring is arranged to establish a radial seal between the inner circumferential surface of the stepped portion and the outer circumferential surface of the large-diameter portion, and wherein the drain nut further comprises a collar portion formed on a front end of the cylindrical portion and protruding radially outwardly from the cylindrical portion so as to be retained by front ends of the piece parts.

2. The drain nut attachment structure according to claim 1, wherein the cylindrical portion has at least two drain holes formed therethrough from an inner circumferential surface to an outer circumferential surface of the cylindrical portion at positions opposed to each other in a diameter direction.

3. The drain nut attachment structure according to claim 1, wherein the piece parts include radially inwardly protruding hooks provided on the front ends thereof, wherein each of the hooks has a tapered surface formed on an inner circumferential side thereof and inclined radially inwardly toward the front, and wherein the collar portion has a tapered surface formed on an outer circumferential side thereof and inclined radially inwardly toward the front.

4. The drain nut attachment structure according to claim 1, wherein the drain nut further comprises a second collar portion protruding radially outwardly from the outer circumferential surface of the nut portion so as to cover a slight clearance between the nut portion and the nut engagement portion from a side of the outer surface of the synthetic resin cover.

5. The drain nut attachment structure according to claim 4, wherein the synthetic resin cover comprises a recess portion formed in the outer surface of the synthetic resin cover such that an outer circumferential edge of the second collar portion is engaged in the recess portion.

6. The drain nut attachment structure according to claim 5, wherein the synthetic resin cover comprises a protruding portion protruding from the outer surface of the synthetic resin cover according to an outer shape of the second collar portion such that the recess portion is defined by the protruding portion.

* * * * *